(12) United States Patent
Bhamra et al.

(10) Patent No.: US 11,243,914 B2
(45) Date of Patent: Feb. 8, 2022

(54) TABLE WITH ONE OR MORE SECONDARY ROWS

(71) Applicant: Microsoft Technology Licensing, LLC, Redmond, WA (US)

(72) Inventors: Rubinder Bhamra, Redmond, WA (US); Kimberly Ann Wolk, Sammamish, WA (US); Li Jun Andy Zhu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 16/403,391

(22) Filed: May 3, 2019

(65) Prior Publication Data

US 2020/0349114 A1 Nov. 5, 2020

(51) Int. Cl.
*G06F 16/16* (2019.01)
*G06F 16/22* (2019.01)
(Continued)

(52) U.S. Cl.
CPC .......... *G06F 16/168* (2019.01); *G06F 3/0482* (2013.01); *G06F 16/2282* (2019.01); *G06F 40/177* (2020.01)

(58) Field of Classification Search
CPC .. G06F 40/177; G06F 16/168; G06F 16/2282; G06F 3/0481; G06F 3/0482
See application file for complete search history.

(56) References Cited

U.S. PATENT DOCUMENTS

| 5,255,356 A | * 10/1993 | Michelman | G06F 40/18 715/217 |
|---|---|---|---|
| 7,000,181 B2 | 2/2006 | Press | |

(Continued)

FOREIGN PATENT DOCUMENTS

| CN | 102317931 A | 1/2012 |
|---|---|---|
| WO | 2013049906 A1 | 4/2013 |

OTHER PUBLICATIONS

Dalgleish, Debra, "How to Expand and Collapse Pivot Table Fields", Retrieved from: https://web.archive.org/web/20180605140922/ https://www.contextures.com/excelpivottableexpandcollapse.html, Jun. 5, 2018, 8 Pages.

(Continued)

*Primary Examiner* — Thu V Huynh
(74) *Attorney, Agent, or Firm* — Alleman Hall Creasman & Tuttle LLP (57) ABSTRACT

A computing device is provided, including a display configured to display a graphical user interface (GUI). The GUI may include a table including a plurality of fields arranged in a plurality of primary rows. The GUI may further include a secondary row display selector associated with a primary row. The computing device may further include a user input device. The computing device may further include a processor configured to receive, from the user input device, a first user input selecting the secondary row display selector. In response to the first user input, the processor may output one or more secondary rows associated with the primary row for display in the GUI. The one or more secondary rows may be displayed in the table adjacent to the primary row. The plurality of primary rows and the one or more secondary rows may be displayed in a visually distinguishable manner.

14 Claims, 10 Drawing Sheets

(51) Int. Cl.
*G06F 40/177* (2020.01)
*G06F 3/0482* (2013.01)

(56) References Cited

U.S. PATENT DOCUMENTS

| | | | |
|---|---|---|---|
| 2006/0107196 A1* | 5/2006 | Thanu | G06F 40/18 715/217 |
| 2007/0050697 A1* | 3/2007 | Lewis-Bowen | G06F 40/18 715/212 |
| 2009/0049372 A1* | 2/2009 | Goldberg | G06F 16/283 715/227 |
| 2011/0072340 A1* | 3/2011 | Miller | G06F 40/18 715/220 |
| 2012/0166486 A1* | 6/2012 | Visser | G06F 40/18 707/792 |
| 2013/0205192 A1* | 8/2013 | Spada | G06F 40/151 715/227 |
| 2015/0186352 A1* | 7/2015 | Greenwood | G06F 40/18 715/217 |
| 2017/0139894 A1 | 5/2017 | Welch | |
| 2019/0050117 A1 | 2/2019 | Coulthard | |
| 2020/0387664 A1* | 12/2020 | Kusumura | G06F 16/243 |

OTHER PUBLICATIONS

"International Search Report and Written Opinion Issued in PCT Application No. PCT/US20/026978", dated Jul. 17, 2020, 12 Pages.
"DataGrid Library for jQuery", Retrieved from: https://www.syncfusion.com/jquery/javascript-ui-controls/datagrid, Retrieved Date: Apr. 1, 2019, 12 Pages.
"Enable DataGrid Inline Editing", Retrieved from: https://www.jeasyui.com/tutorial/datagrid/datagrid12.php, Jun. 11, 2011, 2 Pages.
"Inline Editing of Tables in WordPress", Retrieved from: https://wpdatatables.com/documentation/front-end-editing/inline-editing/, Retrieved Date: Apr. 1, 2019, 3 Pages.
"Reactive Forms", Retrieved from: https://www.telerik.com/kendo-angular-ui/components/grid/editing/editing-reactive-forms/#toc-basic-concepts, Retrieved Date: Apr. 1, 2019, 5 Pages.

* cited by examiner

TABLE WITH ONE OR MORE SECONDARY ROWS

BACKGROUND

When editing a table displayed on a computing device, a user may sometimes edit multiple instances of the same data schema. The data schema may, for example, be a row of the table. When the user edits multiple instances of the same data schema, the user may have to scroll over large numbers of fields having the same data. This may reduce the speed with which the user can edit the table. In addition, the user may be likely to inadvertently edit the wrong field as a result of not being able to concurrently view related fields or headers.

SUMMARY

According to one aspect of the present disclosure, a computing device is provided, including a display configured to display a graphical user interface (GUI). The GUI may include a table including a plurality of fields arranged in a plurality of primary rows. The GUI may further include a secondary row display selector associated with a primary row of the plurality of primary rows. The computing device may further include a user input device. The computing device may further include a processor configured to receive, from the user input device, a first user input selecting the secondary row display selector. In response to the first user input, the processor may be further configured to output one or more secondary rows associated with the primary row for display in the GUI. The one or more secondary rows may be displayed in the table adjacent to the primary row. The plurality of primary rows and the one or more secondary rows may be displayed in a visually distinguishable manner.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
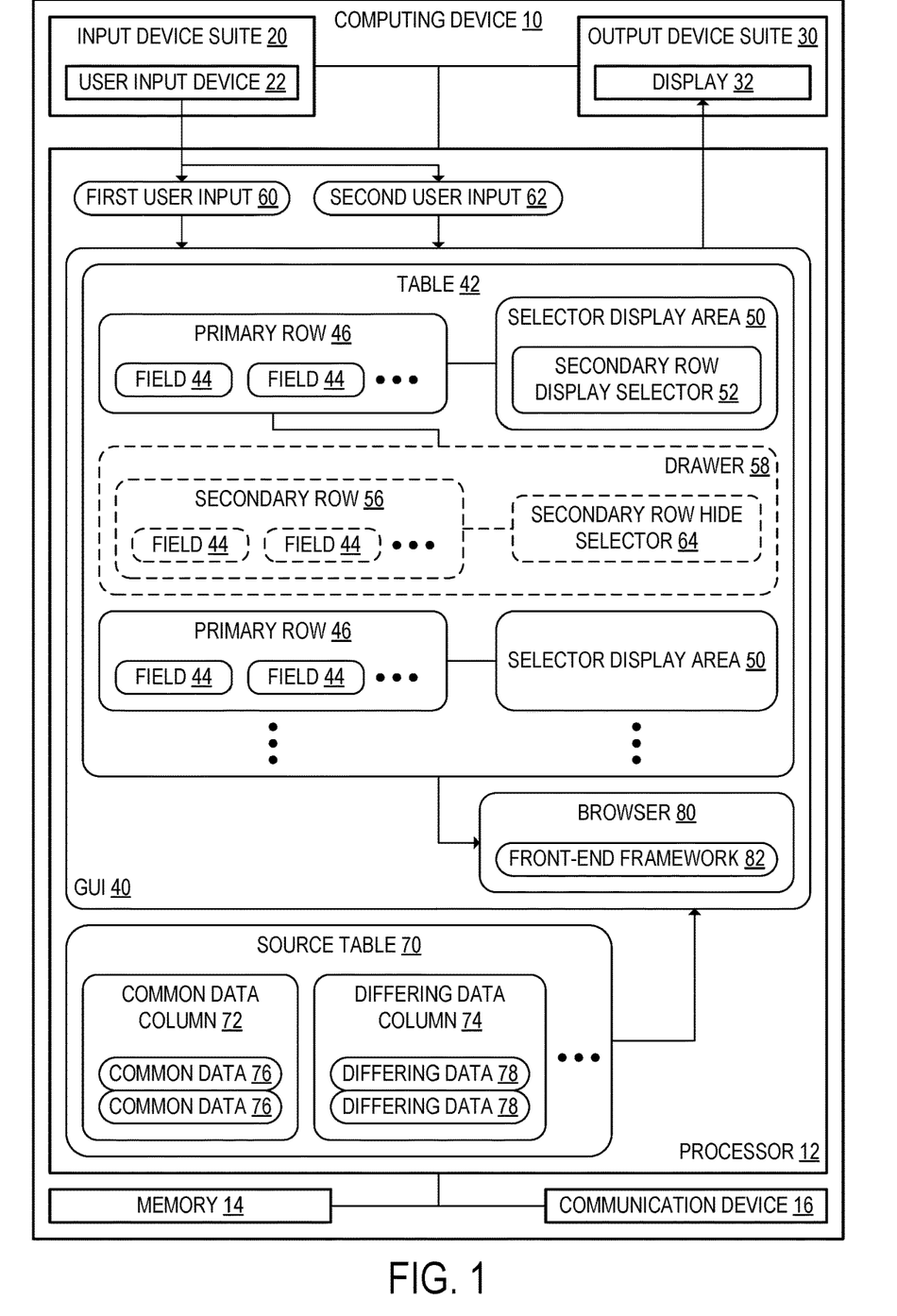
FIG. 1 schematically shows an example computing device including a display configured to display a GUI, according to one embodiment of the present disclosure.

FIG. 1 schematically shows an example computing device 10. The computing device 10 may include a processor 12 and may further include memory 14 operatively coupled to the processor 12. In some embodiments, the computing device 10 may be configured to communicate with one or more other computing devices via one or more communication devices 16. For example, the computing device 10 may be a server computing device configured to communicate with one or more client computing devices. Additionally or alternatively, functions of the computing device 10 and its components may be distributed across a plurality of physical computing devices operatively coupled via the one or more communication devices 16.

The computing device 10 may further include an input device suite 20 including one or more user input devices 22. For example, the input device suite 20 may include a keyboard. The input device suite 20 may additionally or alternatively include other types of user input device 22, such as a mouse, a touchscreen, a trackpad, a camera, a microphone, an accelerometer, and/or an inertial motion unit. Other types of user input devices 22 are also contemplated.

The computing device 10 may further include an output device suite 30 including one or more output devices. The one or more output devices of the output device suite 30 may include a display 32 configured to display a graphical user interface (GUI) 40, as discussed in further detail below. In some embodiments, the output device suite 30 may further include one or more of a speaker, a haptic feedback device, and/or one or more other types of output devices.

Figure 2A:
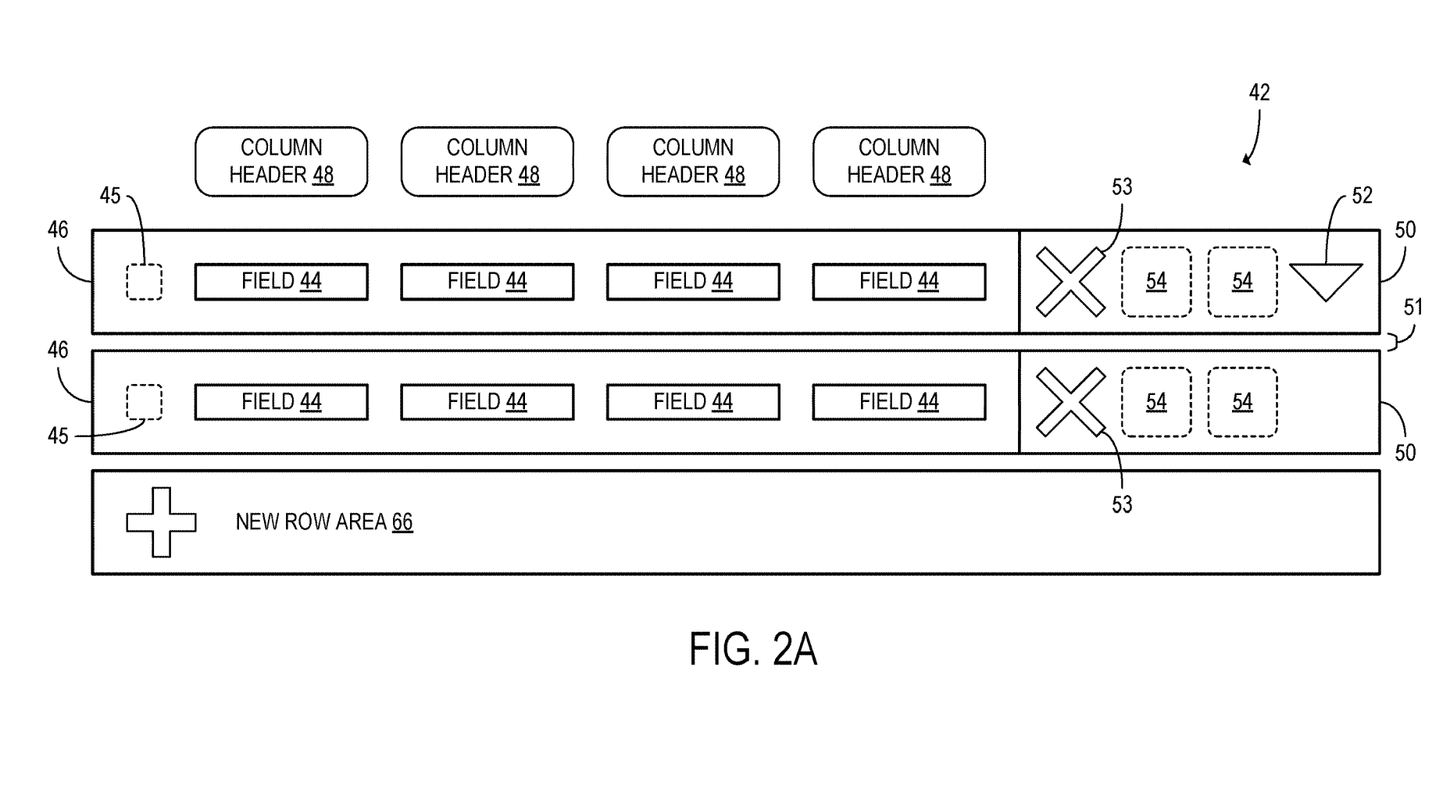
FIG. 2A shows a table including a plurality of primary rows, according to the embodiment of FIG. 1.

The GUI 40 displayed at the display 32 may include a table 42. The table 42 may include a plurality of fields 44 arranged in a plurality of primary rows 46. Each field 44 may include a data value. Alternatively, one or more of the fields 44 may be empty. In some embodiments, each data value included in a field 44 may be a string. FIG. 2A shows an example table 42 according to one example embodiment. In the example of FIG. 2A, each primary row 46 of the table 42 is displayed to have an associated column header 48. The primary rows 46 of the table 42 also are displayed with a gap 51 between them in order to distinguish them from each other. In some embodiments, as in the example of FIG. 2A, each pair of successive primary rows 46 of the plurality of primary rows 46 are displayed so as to be separated by a gap 51.

In addition, each of the primary rows 46 has an associated selection box 45 displayed adjacent the primary row 46. The processor 12 of the computing device may be configured to receive a selection of a selection box 45 via a user input device 22. When the selection box 45 for a primary row 46 is selected, the primary row 46 may be selected such that a user may perform operations on the entire primary row 46.

The table 42 shown in FIG. 2A is further displayed with a new row area 66. In response to a selection of the new row area 66, the processor 12 may be configured to add a new primary row 46 to the table 42 below the lowermost primary row 46.

In addition, the GUI 40 may include a respective selector display area 50 adjacent to each primary row 46. At least one selector display area 50 may include a secondary row display selector 52 associated with the primary row 46 located adjacent to it. The processor 12 may be further configured to receive, from a user input device 22, a first user input 60 selecting the secondary row display selector 52. For example, the first user input 60 may be a keyboard input received from a keyboard included in the input device suite 20. The GUI 40 may be configured in some embodiments such that the user may navigate the table 42 and select one or more fields 44 and/or selectors via the keyboard without having to also use another input device 22. Such embodiments may have the advantage of allowing the user to perform actions in the GUI 40 more quickly by obviating the need for the user to spend time switching between input modalities.

The selector display area 50 associated with each primary row 46 may further include a primary row deletion selector 53. In response to a selection of the primary row deletion selector 53 received via a user input device 22, the processor 12 may be further configured to delete the primary row 46 in the selector display area 50 of which the primary row deletion selector 53 is located. In some embodiments, the processor 12 may output a deletion confirmation GUI element (e.g. a dialog box) for display in the GUI 40 when the primary deletion selector 53 is selected. The deletion confirmation GUI element may provide an option for the user to confirm or cancel deletion of the primary row 46. The selector display area 50 may further include one or more other selectors 54, which may respectively cause the processor 12 to perform one or more other actions when selected.

Figure 2B:
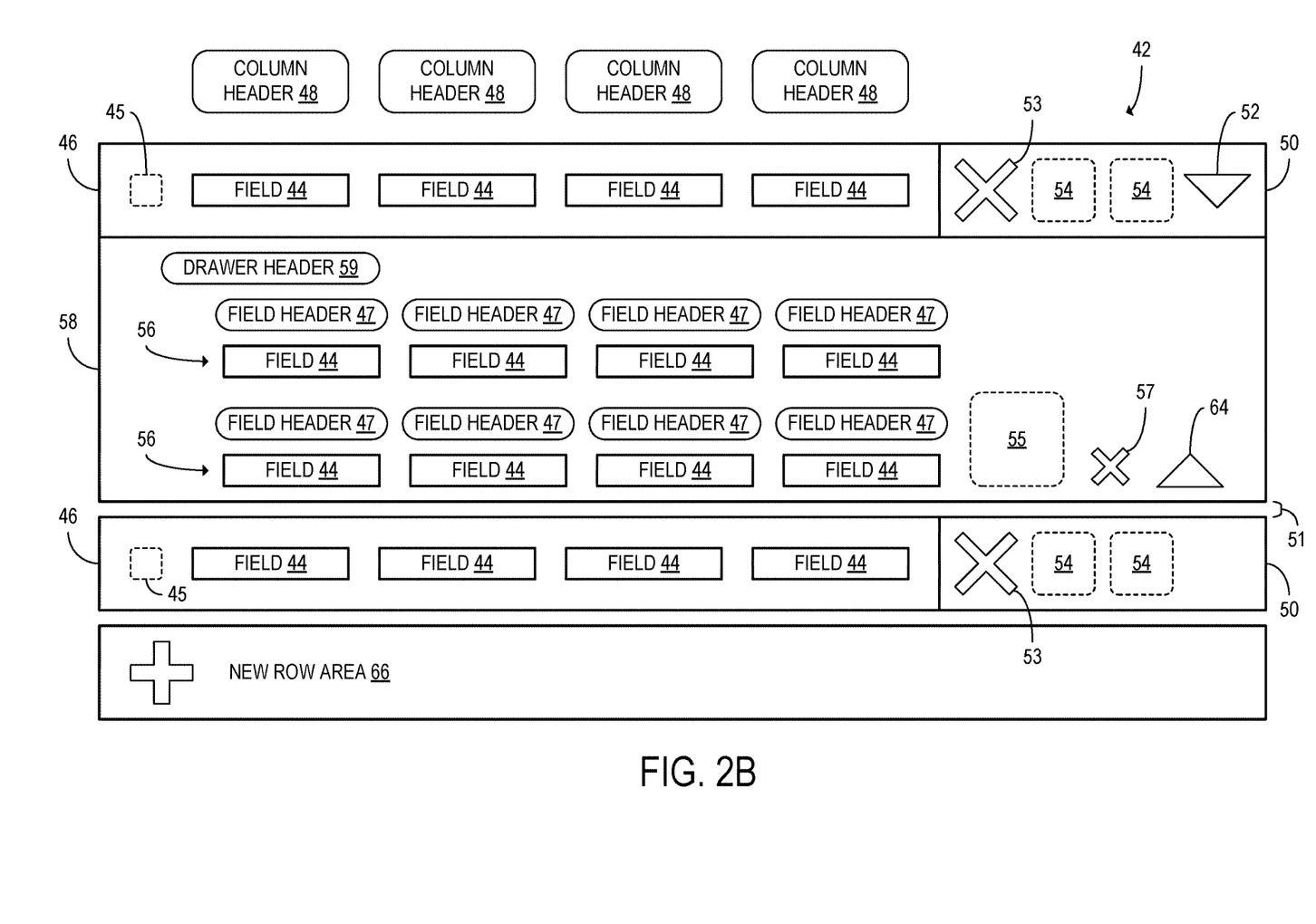
FIG. 2B shows the table of FIG. 2A when secondary rows are displayed.

Returning to FIG. 1, in response to the first user input 60 selecting the secondary row display selector 52, the processor 12 may be further configured to output one or more secondary rows 56 associated with the primary row 46 for display in the GUI 40. FIG. 2B shows the table 42 of FIG. 2A when two secondary rows 56 are displayed, according to one example embodiment. The one or more secondary rows 56 may each include one or more fields 44 that may be filled with data. The one or more secondary rows 56 may be displayed in the table 42 adjacent to the primary row 46. In the example of FIG. 2B, the secondary rows 56 are displayed in a drawer 58 located below the primary row 46 with which the secondary rows are associated. The drawer 58 may be labeled with a drawer header 59. In addition, the fields 44 shown in the drawer 58 have respective field headers 47 in the example of FIG. 2B. Although, in the embodiment of FIG. 2B, respective field headers 47 are shown for the fields 44 included in the secondary row 56, the one or more fields 44 included in the one or more primary rows 46 may have respective field headers 47 in other embodiments. The drawer 58 may further include one or more selectors, as described in further detail below.

The plurality of primary rows 46 and the one or more secondary rows 56 may be displayed in a visually distinguishable manner, as shown in the example of FIG. 2B. For example, the plurality of primary rows 46 and the one or more secondary rows 56 may be visually distinguishable according to a visual characteristic selected from the group consisting of color, height, width, and indentation. In the example of FIG. 2B, the one or more secondary rows 56 are indented relative to the plurality of primary rows 46. In other embodiments, other visual characteristics may be used to distinguish between the plurality of primary rows 46 and the one or more secondary rows 56. For example, the plurality of primary rows 46 and/or the one or more secondary rows 56 may be marked with respective GUI elements labeling them as primary rows 46 or secondary rows 56. In addition, each secondary row 56 located above a primary row 46 may be separated from that primary row 51 by a gap 51 in some embodiments. In other embodiments, the gap 51 may only be used between adjacent primary rows 46 that are in the compressed state.

As shown in FIG. 2B, the drawer 58 in which the one or more secondary rows 56 are displayed may further include a media area 55. The media area 55 may include one or more GUI elements other than strings. For example, the media area 55 may include at least one of an image, a video, a hyperlink, a checkbox, or some other type of GUI element. The drawer 58 may further include a secondary row deletion selector 57. In response to selection of the secondary row deletion selector 57, the processor 12 may be configured to delete, or provide the user with an option to delete, at least one secondary row 56 displayed in the drawer 58. In some embodiments, each secondary row 56 displayed in the drawer 58 may have a respective secondary row deletion selector 57. In other embodiments, a single secondary row deletion selector 57 may be associated with all the secondary rows 56 displayed in the drawer 58.

The processor may be further configured to output a secondary row hide selector 64 in response to the first user input 60. The secondary row hide selector 64 may be displayed in the drawer 58, as shown in FIG. 2B. Alternatively, the secondary row hide selector 64 may be displayed in the selector display area 50 of the primary row 46 with which the secondary row 56 is associated. In embodiments in which the secondary row hide selector is displayed, the processor 12 may be further configured to receive a second user input 62 selecting the secondary row hide selector 64. In response to the second user input 62, the processor 12 may be further configured to hide the one or more secondary rows 56. In some embodiments, each secondary row 56 associated with a primary row 46 may have its own secondary row hide selector 64 in response to the selection of which that secondary row 56 is configured to be hidden. In other embodiments, the one or more secondary rows 56 associated with the primary row 46 may share a secondary row hide selector 64 in response to the selection of which all the secondary rows 56 associated with that primary row 46 are configured to be hidden.

As shown in FIG. 1, the table 42 may be generated based at least in part on a source table 70. The source table 70 may include each field 44 included in the plurality of primary rows 46 and the one or more secondary rows 56. In such embodiments, the processor 12 may be configured to divide the plurality of fields 44 included in the source table 70 between the plurality of primary rows 46 and the one or more secondary rows 56 based on the data respectively included in the plurality of fields 44. For example, in some embodiments, the table 42 may include at least one common data column 72 including common data 76 shared by each primary row 46 of the plurality of primary rows 46. In such embodiments, the common data 76 occurs in each field 44 of the common data column 72. In addition, each secondary row 56 of the one or more secondary rows 56 of the table 42 may include at least one field 44 including differing data 78 that differs from the common data 76. Thus, when each of the one or more secondary rows 56 are hidden, the only fields 44 shown in the table 42 may be the fields 44 that include the common data 76. When the one or more secondary rows 56 are displayed, the GUI 40 may display one or more fields 44 including the differing data 78 that is not included in each of the rows of the table 42. This may allow the user to more easily identify what data differs between rows by displaying the differing data 78 in the one or more secondary rows 56 rather than in the plurality of primary rows 46.

Figure 3A:
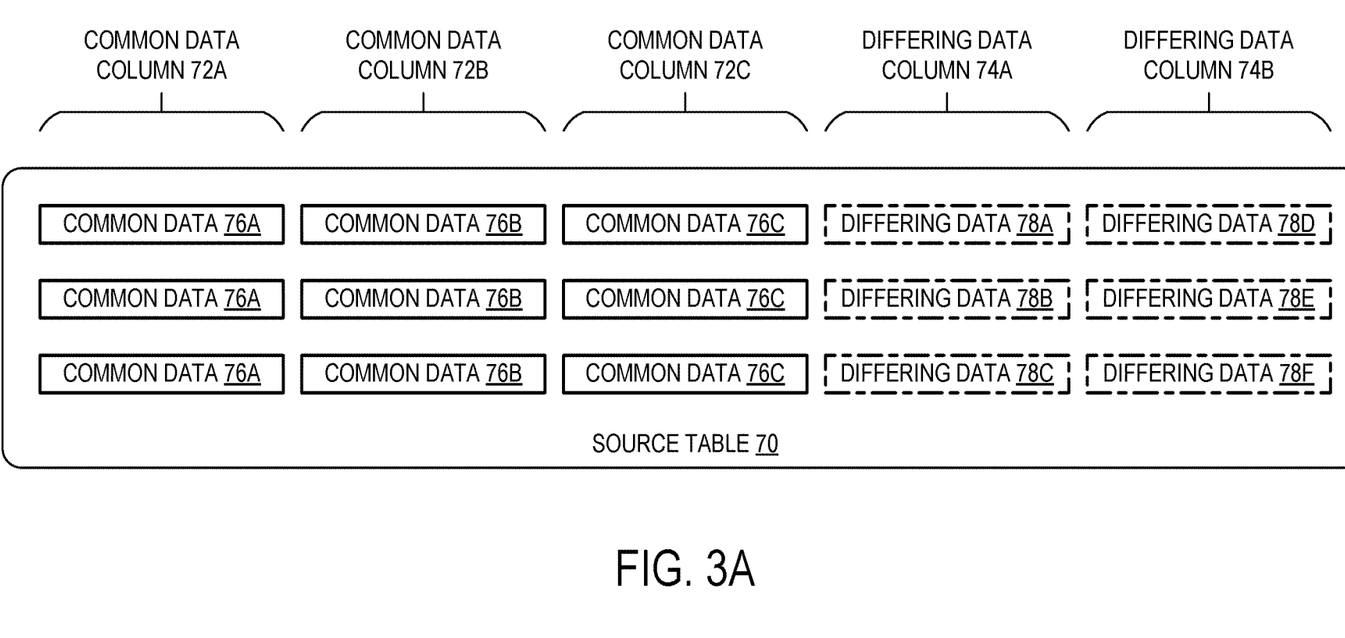
FIG. 3A shows an example source table from which a table may be generated, according to the embodiment of FIG. 1.

FIG. 3A shows an example source table 70 from which the table 42 may be generated. In the example of FIG. 3A, the source table 70 includes three common data columns 72A, 72B, and 72C. The common data columns 72A, 72B, and 72C respectively include fields 44 that include common data 76A, 76B, and 76C. The example source table 70 shown in FIG. 3A further includes two differing data columns 74A and 74B. The first differing data column 74A includes differing data 78A, 78B, and 78C. The second differing data column 74B includes differing data 78D, 78E, and 78F. Thus, each row of the source table 70 has the same common data 76 as each of the other rows, but all the rows have different differing data 78 from each other.

Figure 3B:
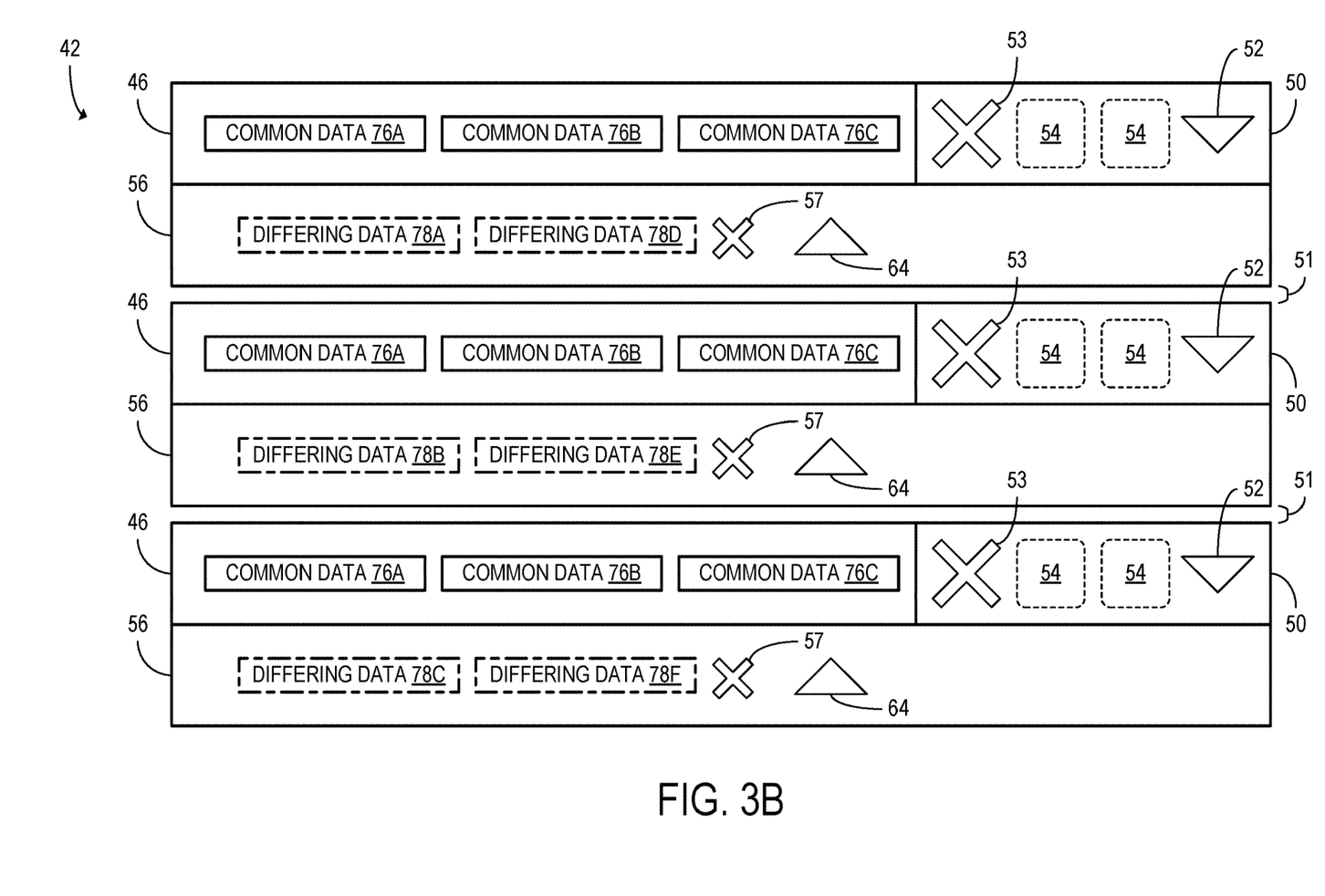
FIG. 3B shows a table generated from the source table of FIG. 3A.

FIG. 3B shows the table 42 generated from the source table 70. The example table 42 shown in FIG. 3B includes three primary rows 46, each of which includes three fields 44 that respectively include the common data 76A, 76B, and 76C. The table 42 of FIG. 3B also includes a respective secondary row 56 for each primary row 46, with each secondary row 56 including the differing data 78 included in a row of the differing data columns 74A and 74B.

Figure 4A:
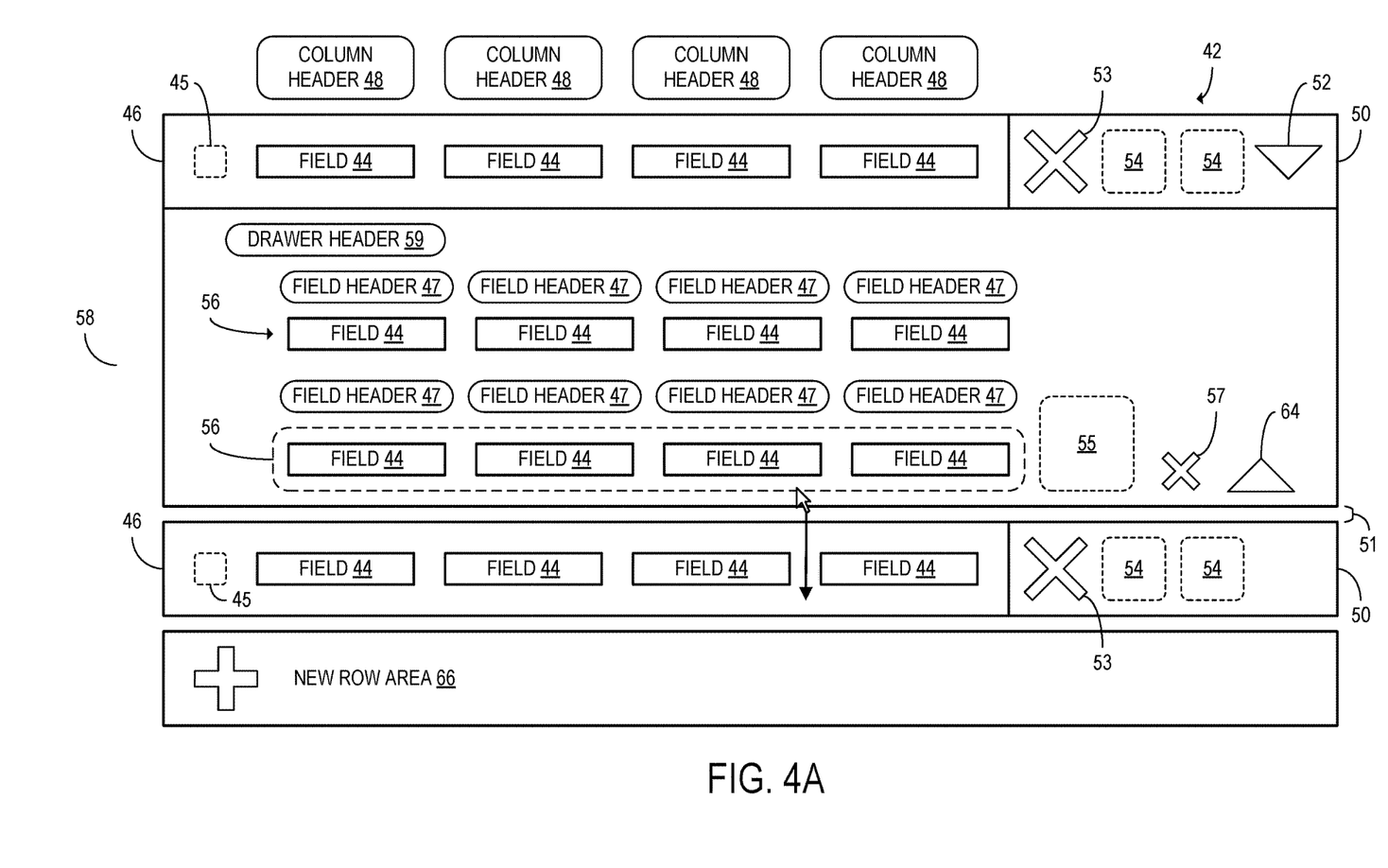
FIG. 4A shows the table of FIG. 2A when a user input moving a row is received.
Figure 4B:
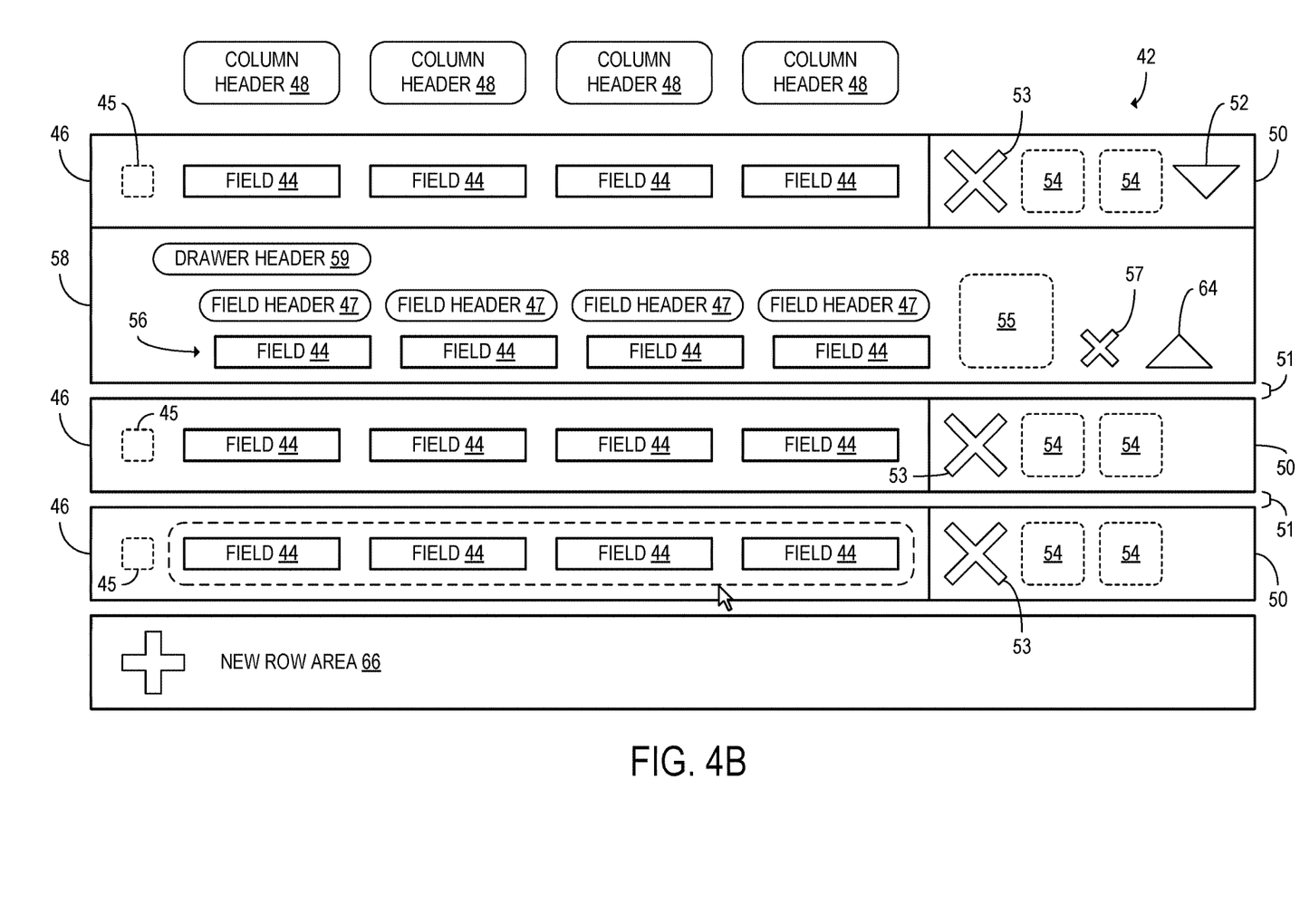
FIG. 4B shows the table of FIG. 4A after the row has been moved.

Turning now to FIGS. 4A-B, the user may convert a row from a secondary row 56 to a primary row 46 or from a primary row 46 to a secondary row 56 in some embodiments. In the example of FIG. 4A, the user drags a secondary row 56 downward to a location outside the drawer 58. In response to this input, the processor 12 may convert the secondary row 56 dragged by the user into a primary row, as seen in FIG. 4B. In other example embodiments, the user may drag a primary row 46 into a drawer 58 to convert that primary row 46 into a secondary row 56.

Returning to FIG. 1, the GUI 40 may include a browser 80 in some embodiments. In such embodiments, the table 42 may be displayed in the browser 80 according to a front-end framework 82 of the browser 80. The front-end framework 82 may specify visual characteristics with which the table 42 is displayed. The front-end framework 82 may further specify respective effects of user interactions with the one or more selectors included in the graphical representation of the table 42. The properties of the table 42 specified in the front-end framework 82 may, in some embodiments, be set using a software development kit (SDK). In one example use case, the front-end framework 82 may be a framework with which the user may program "Internet of Things" appliances. In this example, the browser 80 may load a schema that specifies what fields 44 are included in the one or more secondary rows 56. This schema may be specific to the "Internet of Things" appliance the user is programming.

Figure 5A:
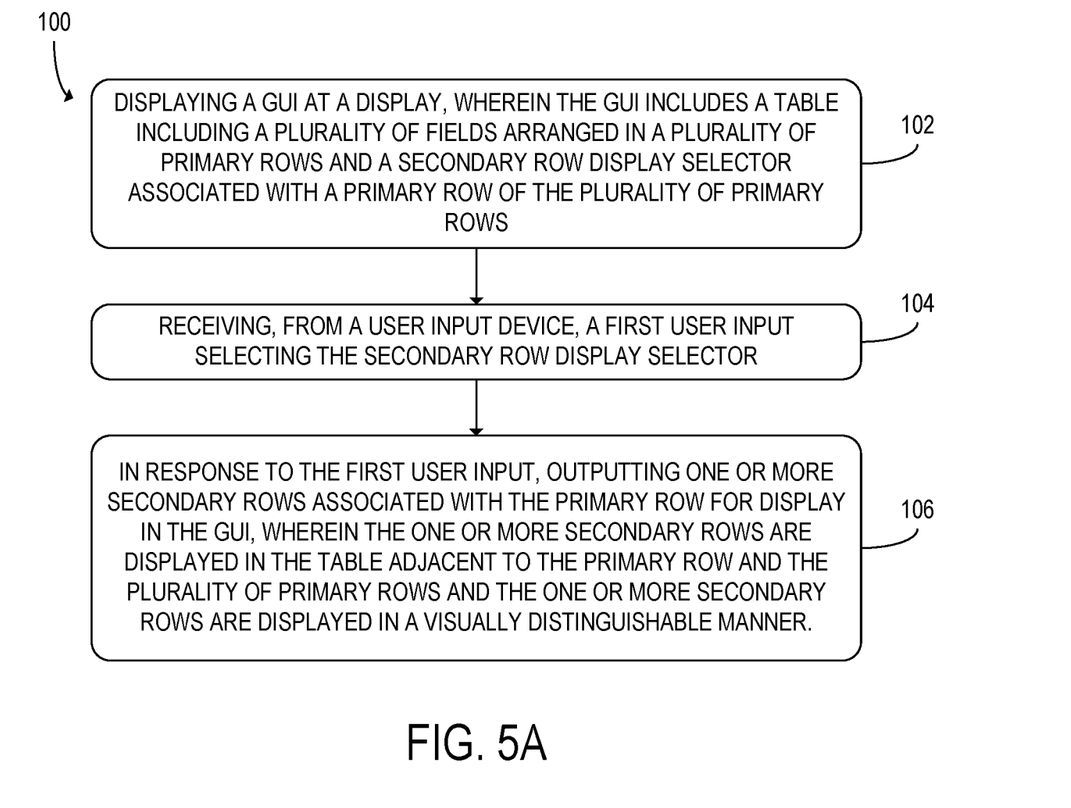
FIG. 5A shows a flowchart of a method that may be used with a computing device, according to the embodiment of FIG. 1.

FIG. 5A shows a flowchart of an example method 100 for use with a computing device. The method 100 may be used with the computing device 10 of FIG. 1 or with some other computing device. At step 102, the method 100 may include displaying a GUI at a display. The GUI may include a table including a plurality of fields arranged in a plurality of primary rows. The plurality of fields in the table may be further arranged into a plurality of columns. The GUI may further include a secondary row display selector associated with a primary row of the plurality of primary rows. The secondary row display selector may be included in the table. In some embodiments, the GUI may include a respective selector display area adjacent to each primary row. For example, the selector display area for a primary row may be located on a left-hand or right-hand side of that primary row. For each primary row having an associated secondary row display selector, the secondary row display selector of that primary row may be located in the selector display area of that primary row.

At step 104, the method 100 may further include receiving, from a user input device, a first user input selecting the secondary row display selector. In some embodiments, the first user input may be a keyboard input. The GUI may, in such embodiments, be configured such that a user may navigate and edit the table using keyboard inputs alone without having to use other input devices.

At step 106, the method 100 may further include outputting one or more secondary rows associated with the primary row for display in the GUI in response to the first user input. The one or more secondary rows may be displayed in the table adjacent to the primary row. For example, the one or more secondary rows may be displayed below the primary row with which they are associated. In some embodiments, the one or more secondary rows may be displayed in a drawer including one or more selectors. In such embodiments, the selector display area of the primary row may extend into the drawer and include the one or more selectors associated with one or more the secondary rows. In other embodiments, the drawer may include a separate secondary row selector display area.

The plurality of primary rows and the one or more secondary rows may be displayed in a visually distinguishable manner. For example, the plurality of primary rows and the one or more secondary rows may be visually distinguishable according to a visual characteristic selected from the group consisting of color, height, width, and indentation. Other methods of making the plurality of primary rows and the one or more secondary rows visually distinguishable may additionally or alternatively be used.

Figure 5B:
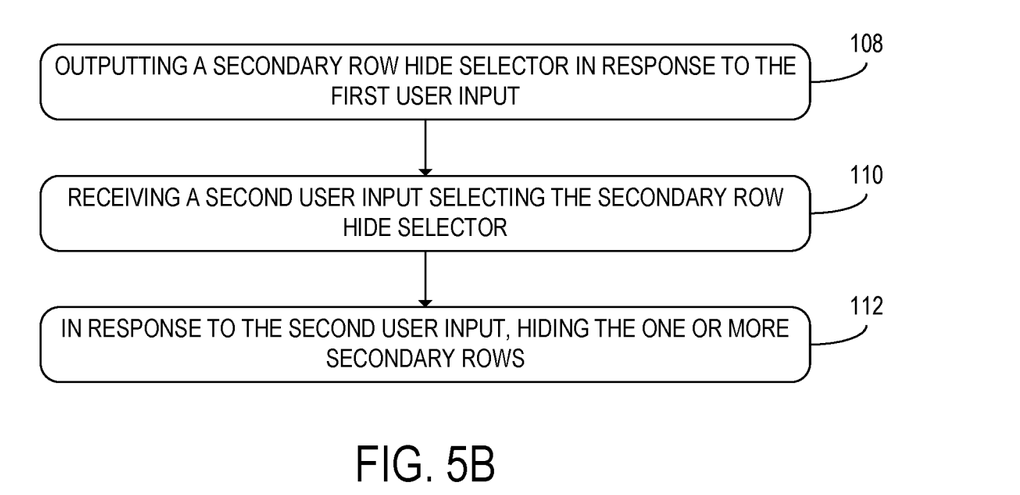
FIGS. 5B-C show additional steps that may optionally be performed when performing the method of FIG. 5A.
Figure 5C:
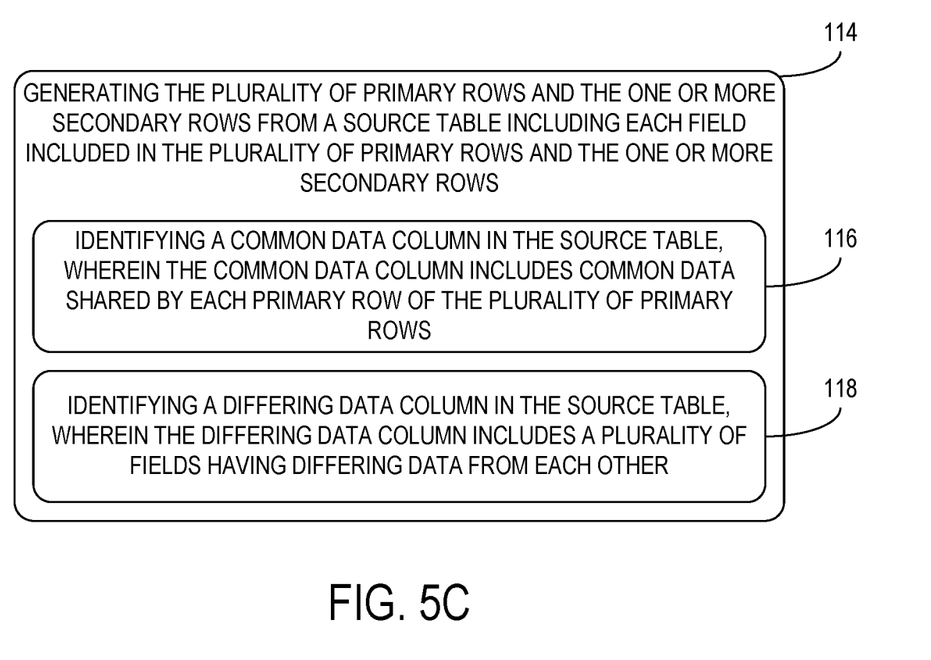

FIG. 5B-C shows additional steps of the method 100 that may be performed in some embodiments. At step 108, the method 100 may further include outputting a secondary row hide selector in response to the first user input. The secondary row hide selector may be displayed in the drawer in embodiments in which the one or more secondary rows are displayed in a drawer. Additionally or alternatively, the secondary row hide selector may be displayed in the selector display area of the primary row with which the one or more secondary rows are associated.

At step 110, the method 100 may further include receiving a second user input selecting the secondary row hide selector. Similarly to the first user input, the second user input may be a keyboard input or may be received via some other user input device. In response to the second user input, the method 100 may further include, at step 112, hiding the one or more secondary rows.

FIG. 5C shows additional steps of the method 100 that may be performed to generate the table prior to displaying the table in the GUI. At step 114, the method 100 may further include generating the plurality of primary rows and the one or more secondary rows from a source table including each field included in the plurality of primary rows and the one or more secondary rows. Step 114 may be performed in embodiments in which the table includes a common data column including common data shared by each primary row of the plurality of primary rows. At step 116, step 114 may further include identifying the common data column in the source table. In addition, in tables generated according to step 114, each secondary row of the one or more secondary rows may include at least one field including differing data that differs from the common data. Step 114 may further include, at step 118, identifying a differing data column in the source table that includes a plurality of fields having differing data from each other.

Using the systems and methods discussed above, a user of the computing device may be able to navigate and manipulate the table more easily than with previous systems and methods for displaying a table in a GUI. By toggling the one or more secondary rows between a displayed state and a hidden state via user input, the user may view data fields in close proximity to fields that include related data. In addition, in embodiments in which the table is configured to be navigated via keyboard inputs, the user may navigate and edit the table more quickly due to not having to switch between different input modalities.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
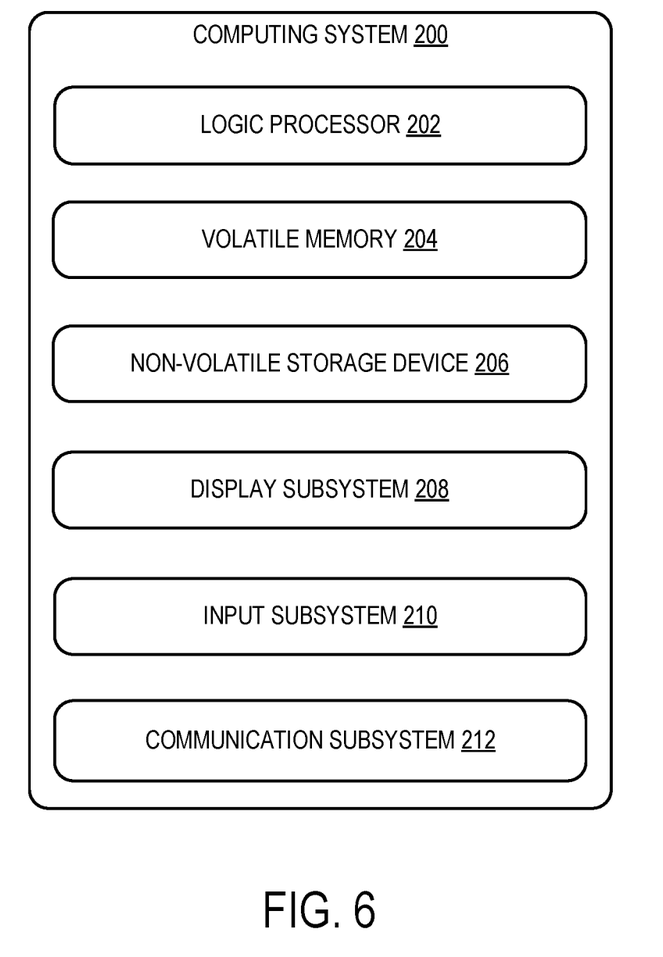
FIG. 6 shows a schematic view of an example computing environment in which the computing device of FIG. 1 may be enacted.

FIG. 6 schematically shows a non-limiting embodiment of a computing system 200 that can enact one or more of the methods and processes described above. Computing system 200 is shown in simplified form. Computing system 200 may embody the computing device 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 6.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

The following paragraphs provide additional support for the claims of the subject application. One aspect provides a computing device comprising a display configured to display a graphical user interface (GUI), wherein the GUI includes a table including a plurality of fields arranged in a plurality of primary rows and a secondary row display selector associated with a primary row of the plurality of primary rows. The computing device includes a user input device and a processor. The processor is configured to receive, from the user input device, a first user input selecting the secondary row display selector. In response to the first user input, the processor is configured to output one or more secondary rows associated with the primary row for display in the GUI, wherein the one or more secondary rows are displayed in the table adjacent to the primary row and the plurality of primary rows and the one or more secondary rows are displayed in a visually distinguishable manner.

In this aspect, additionally or alternatively, the first user input may be a keyboard input. In this aspect, additionally or alternatively, the GUI may include a respective selector display area adjacent to each primary row, and for each primary row associated with one or more secondary rows, the respective secondary row display selector of that primary row may be located in the selector display area of that primary row. In this aspect, additionally or alternatively, the processor may be further configured to output a secondary row hide selector in response to the first user input; receive a second user input selecting the secondary row hide selector; and in response to the second user input, hide the one or more secondary rows.

In this aspect, additionally or alternatively, the table may include a common data column including common data shared by each primary row of the plurality of primary rows. In this aspect, additionally or alternatively, each secondary row of the one or more secondary rows may include at least one field including differing data that differs from the common data. In this aspect, additionally or alternatively, the processor may be further configured to generate the plurality of primary rows and the one or more secondary rows from a source table including each field included in the plurality of primary rows and the one or more secondary rows at least in part by identifying the common data column in the source table. In this aspect, additionally or alternatively, the one or more secondary rows may be displayed below the primary row associated with the secondary row display selector.

In this aspect, additionally or alternatively, each pair of successive primary rows of the plurality of primary rows may be displayed to be separated by a gap. In this aspect, additionally or alternatively, the one or more secondary rows may be displayed in a drawer including one or more selectors. In this aspect, additionally or alternatively, the plurality of primary rows and the one or more secondary rows may be visually distinguishable according to a visual characteristic selected from the group consisting of color, height, width, and indentation. In this aspect, additionally or alternatively, the GUI may include a browser in which the table may be displayed according to a front-end framework of the browser.

Another aspect provides a method for use with a computing device, the method comprising displaying a graphical user interface (GUI) at a display, wherein the GUI includes a table including a plurality of fields arranged in a plurality of primary rows and a secondary row display selector associated with a primary row of the plurality of primary rows. The method includes receiving, from a user input device, a first user input selecting the secondary row display selector. In response to the first user input, the method includes outputting one or more secondary rows associated with the primary row for display in the GUI, wherein the one or more secondary rows are displayed in the table adjacent to the primary row and the plurality of primary rows and the one or more secondary rows are displayed in a visually distinguishable manner.

In this aspect, additionally or alternatively, the first user input may be a keyboard input. In this aspect, additionally or alternatively, the GUI may include a respective selector display area adjacent to each primary row and for each primary row associated with one or more secondary rows, the respective secondary row display selector of that primary row may be located in the selector display area of that primary row. In this aspect, additionally or alternatively, the method may include outputting a secondary row hide selector in response to the first user input; receiving a second user input selecting the secondary row hide selector; and in response to the second user input, hiding the one or more secondary rows. In this aspect, additionally or alternatively, the table may include a common data column including common data shared by each primary row of the plurality of primary rows and each secondary row of the one or more secondary rows may include at least one field including differing data that differs from the common data. In this aspect, additionally or alternatively, the method may include generating the plurality of primary rows and the one or more secondary rows from a source table including each field included in the plurality of primary rows and the one or more secondary rows at least in part by identifying the common data column in the source table. In this aspect, additionally or alternatively, the plurality of primary rows and the one or more secondary rows may be visually distinguishable according to a visual characteristic selected from the group consisting of color, height, width, and indentation.

Another aspect provides a computing device comprising a display configured to display a graphical user interface (GUI) and a processor configured to identify one or more common data columns of a source table having a plurality of rows, wherein the one or more common data columns each include common data shared by each row of the source table.

The processor is configured to identify one or more differing data columns of the source table, wherein the one or more differing data columns each include a plurality of fields having differing data from each other. The processor is configured to generate a plurality of primary rows and one or more secondary rows from the source table, wherein each primary row includes the respective common data of each common data column of the one or more common data columns and each secondary row includes one or more of the fields having differing data from each other that share a row in the source table. The processor is configured to output the plurality of primary rows and the one or more secondary rows for display in the GUI, wherein the plurality of primary rows and the one or more secondary rows are displayed in a visually distinguishable manner.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
    a processor configured to:
        programmatically generate, from a source table, a table including a plurality of fields arranged in a plurality of primary rows and one or more secondary rows, wherein:
            the plurality of primary rows are programmatically generated at least in part by identifying, for inclusion in the table, a common data column of the source table including common data that have a same data schema shared by each primary row of the plurality of primary rows; and
            the one or more secondary rows are programmatically generated at least in part by identifying, for inclusion in the table, at least one field of a differing data column of the source table including differing data that differs among rows of the differing data column and from the common data;
    a display configured to display a graphical user interface (GUI), wherein the GUI includes:
        the generated table including the plurality of fields arranged in the plurality of primary rows including the common data, wherein the one or more secondary rows are hidden; and
        a secondary row display selector associated with a primary row of the plurality of primary rows; and
    a user input device;
    wherein the processor is further configured to:
        receive, from the user input device, a first user input selecting the secondary row display selector;
        in response to the first user input, output at least one secondary row of the one or more secondary rows associated with the primary row for display in the GUI, wherein:
            the at least one secondary row including the different data is displayed in the table adjacent to the primary row; and
            the plurality of primary rows and the at least one secondary row are displayed in a visually distinguishable manner.

2. The computing device of claim 1, wherein the first user input is a keyboard input.

3. The computing device of claim 1, wherein:
    the GUI includes a respective selector display area adjacent to each primary row; and
    for each primary row associated with at least one secondary row of the one or more secondary rows, the respective secondary row display selector of that primary row is located in the selector display area of that primary row.

4. The computing device of claim 1, wherein the processor is further configured to:
    output a secondary row hide selector in response to the first user input;
    receive a second user input selecting the secondary row hide selector; and
    in response to the second user input, hide the at least one secondary row of the one or more secondary rows.

5. The computing device of claim 1, wherein the at least one secondary row is displayed below the primary row associated with the secondary row display selector.

6. The computing device of claim 1, wherein each pair of successive primary rows of the plurality of primary rows is displayed to be separated by a gap.

7. The computing device of claim 1, wherein the at least one secondary row is displayed in a drawer including one or more selectors.

8. The computing device of claim 1, wherein the plurality of primary rows and the at least one secondary row are visually distinguishable according to a visual characteristic selected from the group consisting of color, height, width, and indentation.

9. The computing device of claim 1, wherein the GUI includes a browser in which the table is displayed according to a front-end framework of the browser.

10. A method for use with a computing device, the method comprising:
    programmatically generating, from a source table, a table including a plurality of fields arranged in a plurality of primary rows and one or more secondary rows, wherein:
        the plurality of primary rows are programmatically generated at least in part by identifying, for inclusion in the table, a common data column of the source table including common data that have a same data schema shared by each primary row of the plurality of primary rows; and
        the one or more secondary rows are programmatically generated at least in part by identifying, for inclusion in the table, at least one field of a differing data column of the source table including differing data that differs among rows of the differing data column and from the common data;
    displaying a graphical user interface (GUI) at a display, wherein the GUI includes:
        the generated table including the plurality of fields arranged in the plurality of primary rows including the common data, wherein the one or more secondary rows are hidden; and
        a secondary row display selector associated with a primary row of the plurality of primary rows;

receiving, from a user input device, a first user input selecting the secondary row display selector;

in response to the first user input, outputting at least one secondary row of the one or more secondary rows associated with the primary row for display in the GUI, wherein:

the at least one secondary row including the different data is displayed in the table adjacent to the primary row; and the plurality of primary rows and the at least one secondary row are displayed in a visually distinguishable manner.

11. The method of claim 10, wherein the first user input is a keyboard input.

12. The method of claim 10, wherein:

the GUI includes a respective selector display area adjacent to each primary row; and for each primary row associated with at least one secondary row of the one or more secondary rows, the respective secondary row display selector of that primary row is located in the selector display area of that primary row.

13. The method of claim 10, further comprising:

outputting a secondary row hide selector in response to the first user input;

receiving a second user input selecting the secondary row hide selector; and in response to the second user input, hiding the at least one secondary row of the one or more secondary rows.

14. The method of claim 10, wherein the plurality of primary rows and the one or more secondary rows are visually distinguishable according to a visual characteristic selected from the group consisting of color, height, width, and indentation.

* * * * *